(12) United States Patent  
Lan (10) Patent No.: US 10,352,087 B2  
(45) Date of Patent: Jul. 16, 2019

(54) METHOD FOR CONTROLLING BARRIER DOOR

(71) Applicant: Powertech Automation Inc., New Taipei (TW)

(72) Inventor: Hung-Wei Lan, New Taipei (TW)

(73) Assignee: POWERTECH AUTOMATION INC., New Taipei (TW)

(*) Notice: Subject to any disclaimer, the term of this patent is extended or adjusted under 35 U.S.C. 154(b) by 272 days.

(21) Appl. No.: 15/461,440

(22) Filed: Mar. 16, 2017

(65) Prior Publication Data

US 2018/0179803 A1 Jun. 28, 2018

(30) Foreign Application Priority Data

Dec. 26, 2016 (TW) .............................. 105143240 A (51) Int. Cl.
*E06B 3/00* (2006.01)
*E05F 15/73* (2015.01)
(Continued)

(52) U.S. Cl.
CPC ............ *E05F 15/73* (2015.01); *E05F 15/668* (2015.01); *G05B 19/042* (2013.01);
(Continued)

(58) Field of Classification Search
CPC . E05F 15/20; E05F 15/00; E05F 11/00; E06B 3/00
(Continued)

(56) References Cited

U.S. PATENT DOCUMENTS

| 7,495,556 B2 * | 2/2009 | Eubelen | E05F 15/43 340/545.1 |
| 7,984,590 B2 * | 7/2011 | Hoshide | E05F 15/73 49/31 |

(Continued)

FOREIGN PATENT DOCUMENTS

| CN | 108001460 A | 5/2018 |
| EP | 1313321 A1 | 5/2003 |

OTHER PUBLICATIONS

Office Action dated Jun. 27, 2018 of the corresponding Australian patent application No. 2017202764.

*Primary Examiner* — Jerry E Redman
(74) *Attorney, Agent, or Firm* — Chun-Ming Shih; HDLS IPR Services (57) ABSTRACT

A method for controlling barrier door is disclosed. The method includes following steps of: monitoring a barrier door (20) for generating multiple monitor images continually via a monitoring camera (104); recognizing a barrier door feature pattern (30-34) arranged on the barrier door (20) from the monitor images and determining a shade status of the barrier door feature pattern (30-34); recognizing a movement feature pattern arranged on a movable object from the monitor images and determining a movement direction of the movement feature pattern continuously; controlling the barrier door (20) to open when the shade status is consistent with a default shade status, the movement direction is consistent with a default movement direction, and the barrier door (20) is closed. Therefore, the barrier door can automatically and timely open without arranging the RFID reader, so as to provide the user the batter convenience.

9 Claims, 12 Drawing Sheets

(51) Int. Cl.
*E05F 15/668* (2015.01)
*G05B 19/042* (2006.01)
*G07C 9/00* (2006.01)

(52) U.S. Cl.
CPC .... *G07C 9/00896* (2013.01); *E05F 2015/767* (2015.01); *E05Y 2900/106* (2013.01); *E05Y 2900/132* (2013.01); *G05B 2219/2628* (2013.01); *G07C 2009/00928* (2013.01)

(58) Field of Classification Search
USPC .................................... 49/506, 199, 200, 25
See application file for complete search history.

(56) References Cited

U.S. PATENT DOCUMENTS

| | | | | |
|---|---|---|---|---|
| 8,077,034 B2* | 12/2011 | Borlez | ................ | G08B 13/196 340/5.7 |
| 8,904,708 B2* | 12/2014 | Zacchio | ................ | B66B 13/26 49/25 |
| 9,064,394 B1 | 6/2015 | Trundle | | |
| 9,341,013 B2* | 5/2016 | Iwata | ................ | E05F 15/73 |
| 2001/0030689 A1* | 10/2001 | Spinelli | ................ | H04N 7/183 348/155 |
| 2002/0170685 A1* | 11/2002 | Weik, III | ................ | E05F 1/006 160/133 |
| 2003/0122514 A1* | 7/2003 | Mercier | ................ | H04N 7/186 318/280 |
| 2005/0057340 A1* | 3/2005 | Fitzgibbon | ......... | G07C 9/00182 340/5.71 |
| 2012/0297681 A1* | 11/2012 | Krupke | ................ | E05F 15/60 49/324 |
| 2015/0027057 A1* | 1/2015 | Britt, Jr. | ................ | E05F 15/77 49/14 |
| 2015/0148967 A1* | 5/2015 | Logan | ................ | G05B 15/02 700/276 |
| 2017/0198516 A1 | 7/2017 | Dey et al. | | |
| 2017/0344923 A1* | 11/2017 | Pike | ................ | G06F 3/0482 |

* cited by examiner

METHOD FOR CONTROLLING BARRIER DOOR

BACKGROUND OF THE INVENTION

Field of the Invention

The technical field relates to method for control, and more particularly, relates to method for controlling barrier door.

Description of Related Art

In a home barrier door system (such as a home garage door system) of the related art, a user must operate a switcher of the barrier door system manually to open a barrier door when the user wants to drive a car out, and thus it's very inconvenient.

To solve the above-mentioned problem, an automatic barrier door system had been provided. Above-mentioned automatic barrier door system comprises a long-distance RFID reader and a RFIF tag. The long-distance RFID reader is arranged on a barrier door, the RFID tag is arranged in a car. When the user wants to drive a car out, the user only needs to drive the car in an induction range (such as the barrier door nearby) of the long-distance RFID reader, so as to make the automatic barrier door system induct the RFID tag via the long-distance RFID reader and open the barrier door automatically.

Although the above-mentioned automatic barrier door system can open the barrier door timely, cost for setting the automatic barrier door system increases significantly due to the high cost of the long-distance RFID reader.

SUMMARY OF THE INVENTION

The present disclosed example is directed to a method for controlling barrier door which has ability of determining whether there is a request of opening the barrier door via monitoring camera.

One of the exemplary embodiments, a method for controlling barrier door, comprising:

a) shooting a barrier door (20) continually via a monitoring camera (104) for generating a plurality of monitor images;

b) recognizing a barrier door feature pattern (30-34) arranged on the barrier door (20) from the plurality of the monitor images continually and determining a shade status of the barrier door feature pattern (30-34);

c) recognizing a movement feature pattern arranged on a movable object from the plurality of the monitor images continually and determining a movement direction of the movement feature pattern; and d) controlling the barrier door (20) to open when the shade status is consistent with a first default status, the movement direction is consistent with a first default direction, and an open-close status of the barrier door (20) is closed.

Via using the monitoring camera and the computer vision technology to determine the time of opening the barrier door, the present disclosed example can open the barrier door automatically and timely without arranging the RFID reader, so as to provide the user the batter convenience.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
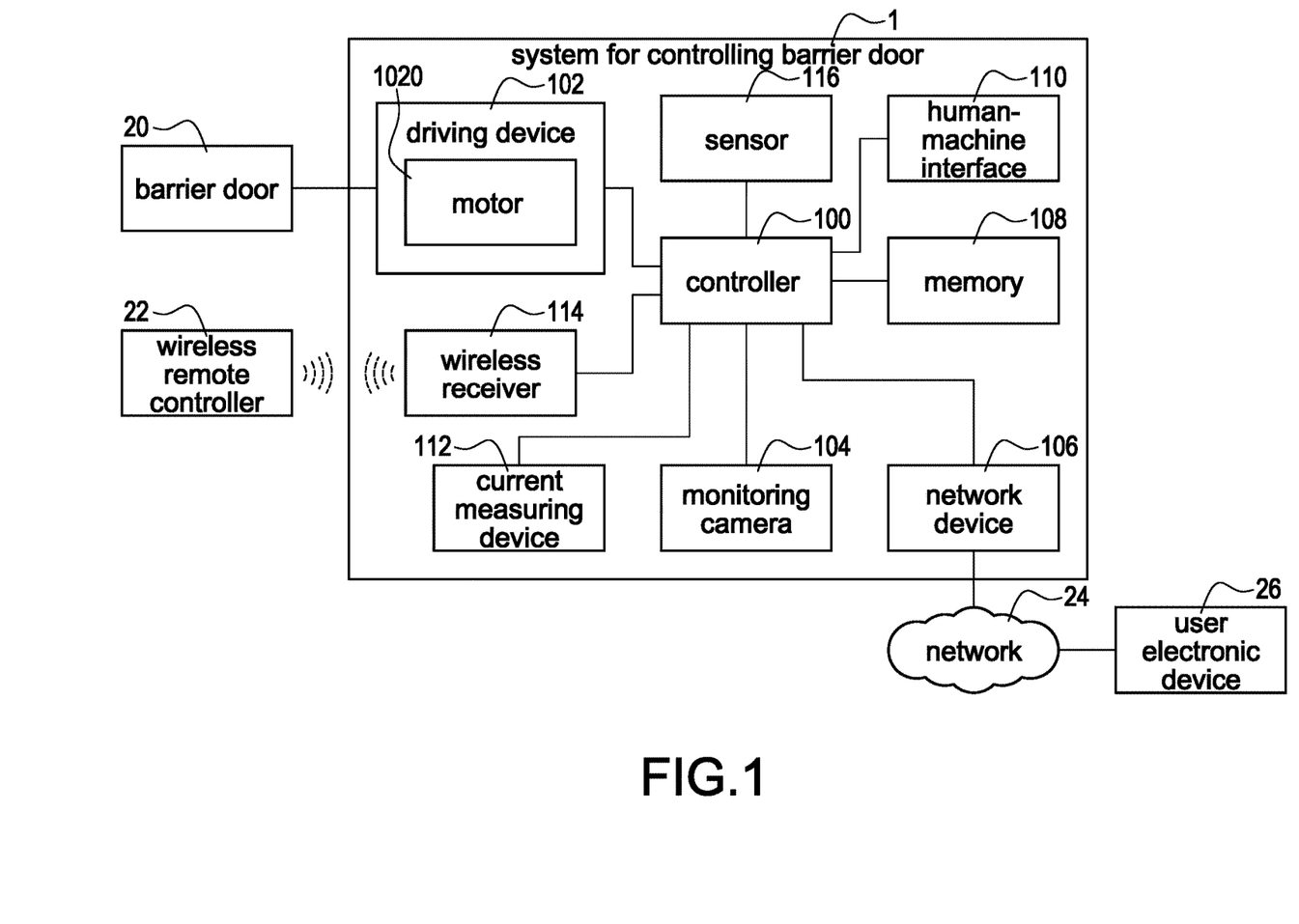
FIG. 1 is an architecture diagram of a system for controlling barrier door according to a first embodiment of the present disclosed example.

First, please refer to FIG. 1, which is an architecture diagram of a system for controlling barrier door according to a first embodiment of the present disclosed example. A system 1 for controlling barrier door of the present disclosed example mainly comprises a driving device 102, a monitoring camera 104, a network device 106, a memory 108 and a controller 100 electrically connected to above-mentioned elements.

The driving device 102 is connected to a barrier door 20 and used to control the barrier door to open or close. More specifically, the driving device 102 comprises motor 1020 and a driving structure (such as a gear set which is not shown in figure). When an axis of the motor 1020 rotates in a first operation direction, the axis can gear the driving structure to open the barrier door 20. When the axis of the motor 1020 rotates in a second operation direction which is opposite to the first operation direction, the axis can gear the driving structure to close the barrier door 20.

The monitoring camera 104 is used to shoot a monitoring environment (namely, the environment inside the barrier door), and can generate a monitor video comprising a plurality of multiple frames of monitor images (such as a monitor video with 30 frames per second). In one embodiment, a lens of the monitoring camera 104 is arranged heading to the barrier door 20 for shooting a status of barrier door 20.

The network device 106 is used to connect a network 24 (such as internet or LAN). The network device 106 can establish a connection and execute communication with a user electronic device 26 held by a user via the network 24. The memory 108 is used to store data temporarily or permanently.

The controller 100 is used to control each element of the system 1 for controlling barrier door for implementing a function of automatically controlling barrier door (described later).

In one embodiment, the system 1 for controlling barrier door further comprises a human-machine interface 110 (such as indicator light, speaker, display or the other output devices, button, touchpad or the other input device or any combination of above-mentioned devices) electrically connected to the controller 100. When the human-machine interface 110 comprises input device, the user can operate the human-machine interface 110 for sending a barrier door control signal (such as open control signal, close control signal or pause control signal) to the controller 100, so as to make the controller 100 control the barrier door (such as opening the barrier door, closing the barrier door, pausing on opening/closing the barrier door) according to the received barrier door control signal.

In one embodiment, the system 1 for controlling barrier door further comprises a current measuring device 112 electrically connected to the controller 100. The current measuring device 112 can measure a current value of the motor 1020 and transfer the measured current value to the controller 100.

In one embodiment, the system 1 for controlling barrier door further comprises a wireless receiver 114 electrically connected to the controller 100. The user can operate a wireless remote controller 22 having paired with the wireless receiver 114 to send the barrier door control signal to the wireless receiver 114 wirelessly, so as to make the wireless receiver 114 forward the received barrier door control signal to the controller 100 to control the barrier door 20 to open or close.

In one embodiment, the system 1 for controlling barrier door further comprises a sensor 116 (such as passive infrared (PIR) sensor, ultrasonic sensor, thermal sensor, light sensor, sound sensor or the other sensors having ability of detecting invasion of human or variety of environment) electrically connected to the controller 100. Preferably, the sensor 116 can trigger and send an invasion signal to the controller 100. The controller 100 can send an invasion notification message to the user electronic device 26 when receiving the invasion signal via the network device 106.

In one embodiment, in the general status, the controller 100 only stores the shot monitor images temporarily in the memory 108 rather that permanently, such as using the means of loop recording or buffer storage. The controller 100 stores the monitor images which were shot recently (such as all the monitor images shot during the past 5 minutes before receiving the invasion signal to the time of stopping receiving the invasion signal) in the memory 108 permanently when receiving the invasion signal. Thus, because the memory 108 only permanently stores the images related to an invasion event, the present disclosed example can effectively reduce the permanent storage space usage of memory 108 and make sure that the invasion event could be completely recorded.

In one embodiment, the controller 100, the memory 108, the monitoring camera 104, the network device 106 and the sensor 116 are arranged in the same case or the same circuit board (first circuit board), and can operate as a single network camera. The driving device 102, the human-machine interface 110, the current measuring device 112 and the wireless receiver 114 are connected to the same circuit board (second circuit board), and can operate as a single manual barrier door control device. This embodiment can make above-mentioned network camera and above-mentioned manual barrier door control device communicate each other via electrically connecting above-mentioned first circuit board to above-mentioned second circuit board, so as to implement the system 1 for controlling barrier door.

Following description will explain how the present disclosed example to achieve the function of automatically controlling barrier door via computer vision technology. In the first, the user can arrange (such as pasting or jet printing) one or more barrier door feature pattern (such as a plurality of barrier door feature patterns 30-34 shown in FIG. 4A to FIG. 4I) on the barrier door 20, and can arrange one or more movement feature pattern (such as a movement feature pattern 42 shown in FIG. 4A to FIG. 4I) arranged on a movable object (such as the user or a car). Then, the system 1 for controlling barrier door and the method for controlling barrier door can recognize a status of the barrier door feature pattern(s) and the movement feature pattern(s) (such as a shade status or a movement direction) via image-recognizing technology, determine whether the user wants to go out or come back according to the recognized status, and control the barrier door automatically according to a recognized result.

Please be noted that above-mentioned feature pattern (such as barrier door feature pattern or movement feature pattern) can be any pattern which is recognizable, such as two-dimensional barcode, user default logo, license plate, human face and so forth. The present disclosed example is not intended to limit a carrier of the feature pattern. Above-mentioned feature pattern can be implement via being jet printed on an object (namely, the carrier is the object) directly or being outputted on paper (namely, the carrier is the paper).

Each embodiment of the method for controlling barrier door of each embodiment of the present disclosed example mainly is applied to the system 1 for controlling barrier door. More specifically, the memory 108 stores a computer program (not shown in figure) comprising the computer-executable codes. After the controller 100 executes the computer program, the controller 100 can control the system 1 for controlling barrier door to implement each step of the method for controlling barrier door of each embodiment of the present disclosed example.

Figure 2:
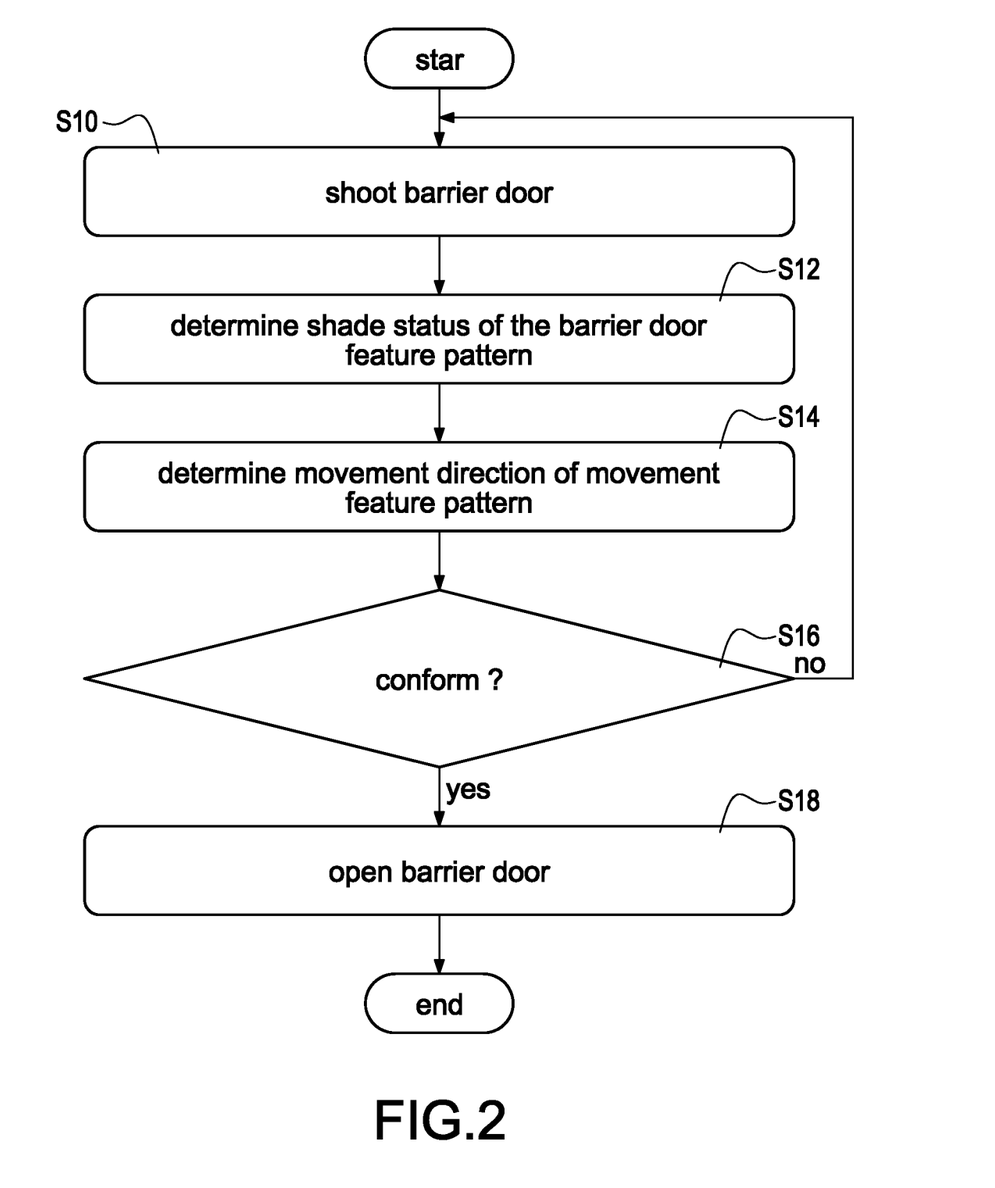
FIG. 2 is a flowchart of a method for controlling barrier door according to a first embodiment of the present disclosed example.

Please refer to FIG. 2 simultaneously, which is a flowchart of a method for controlling barrier door according to a first embodiment of the present disclosed example. The method for controlling barrier door of this embodiment comprises following steps.

Step S10: the controller 100 shoots the barrier door 20 continually via the monitoring camera 104 for generating a plurality of the monitor images.

Step S12: the controller 100 recognizes the barrier door feature pattern arranged on the barrier door 20 continually in the plurality of the monitor images, and determines a shade status of the barrier door feature pattern.

Preferably, the memory 108 pre-stores an image of the barrier door feature pattern, the controller 100 recognizes a position of the barrier door feature pattern in each monitor image and determines the shade status of the barrier door feature pattern in each monitor image (such as being completely shaded, being partially shaded or being completely exposed) via comparing each monitor image with the pre-stored barrier door feature pattern.

Preferably, the controller 100 detects the positions of the plurality (such as three or more) of the barrier door feature patterns arranged on the barrier door 20 in each monitor image via the Scale-Invariant Feature Transform (SIFT) algorithm, and determines the shade status according to a result of detecting the positions.

Step S14: the controller 100 recognizes the movement feature pattern arranged on the movable object continually in the plurality of the monitor images, and determines a movement direction of the recognized movement feature pattern.

Preferably, the memory 108 pre-stores an image of the movement feature pattern, the controller 100 detects a position of the movement feature pattern in each monitor image via comparing each monitor image with the pre-stored image of movement feature pattern, and determines the movement direction of the movement feature pattern according to a position variety of the movement feature pattern in the continuous monitor images.

Step S16: the controller 100 determines whether the shade status of the barrier door feature pattern and the movement direction of the movement feature pattern are consistent with a default condition of going out. More specifically, above-mentioned condition of going out comprises a first default status, a first default direction and a first default open-close status of the barrier door 20. The controller 100 determines whether the shade status is consistent with the first default status (such as the barrier door feature pattern is shade by the movable object), the movement direction is consistent with the first default direction (such as approaching heading to the barrier door 20 inside out), and the open-close status of the barrier door 20 is closed (namely, the first default open-close status). When all above-mentioned conditions are consistent, the controller 100 determines that the user wants to go out, and performs a step S18. Otherwise, the controller 100 performs the step S16 for continual determination.

Preferably, the controller 100 calculates a movement vector of each barrier door feature pattern according to the positions of each barrier door feature pattern in the continuous monitor images, and determines a displacement variety of the barrier door 20 according to the calculated movement vector of each barrier door feature pattern. Furthermore, the controller 100 can calculate the open-close status of the barrier door 20 according to the displacement variety of the barrier door 20. For example, the controller 100 calculates a current position of the barrier door according to an initial open-close status and the displacement variety, and determines whether the calculated current position is consistent with an open position or a close position of the barrier door 20.

Take the initial open-closed status of the barrier door 20 being close for example, the controller 100 can determine that the barrier door 20 is opening when determining that the barrier door 20 is moved heading to an open barrier door direction (such as heading to top of the monitor image) according to the movement vector, determines that the open-close status is open when the displacement variety of the barrier door 20 is consistent with a default displacement variety. Besides, the controller 100 can determine that the barrier door 20 is closing when determining that the barrier door 20 is moved heading to an close barrier door direction (such as heading to bottom of the monitor image) according to the movement vector, determines that the open-close status is closed when the displacement variety of the barrier door 20 is consistent with a default displacement variety.

Step S18: the controller 100 controls the driving device 102 to operate the motor 1020 for opening the barrier door 20 when determining that the user wants to go out.

Via using the monitoring camera and the computer vision technology to determine the time of opening the barrier door, the present disclosed example can open the barrier door automatically and timely without arranging the RFID reader, so as to provide the user the batter convenience.

Besides, via determining the shade status of the barrier door feature pattern arranged at the fixed position and the movement direction of the movement feature pattern arranged on the movable moving object, the present disclosed example can double-check the user's purpose (namely, the user wants to go out, had left or comes back) via simultaneously referring the shade status and the movement direction, so as to reduce the probability of misjudgment and enhance correctness of determination.

Please be noted that, although the controller 100 determines whether the user wants to go out according to both the shade status of the barrier door feature pattern and the movement direction of the movement feature pattern in above-mentioned embodiment, but this specific example is not intended to limit the scope of the present disclosed example.

In another embodiment of the present disclosed example, the control 100 can determine whether the user wants to go out according to either the shade status of the barrier door feature pattern or the movement direction of the movement feature pattern.

Figure 3:
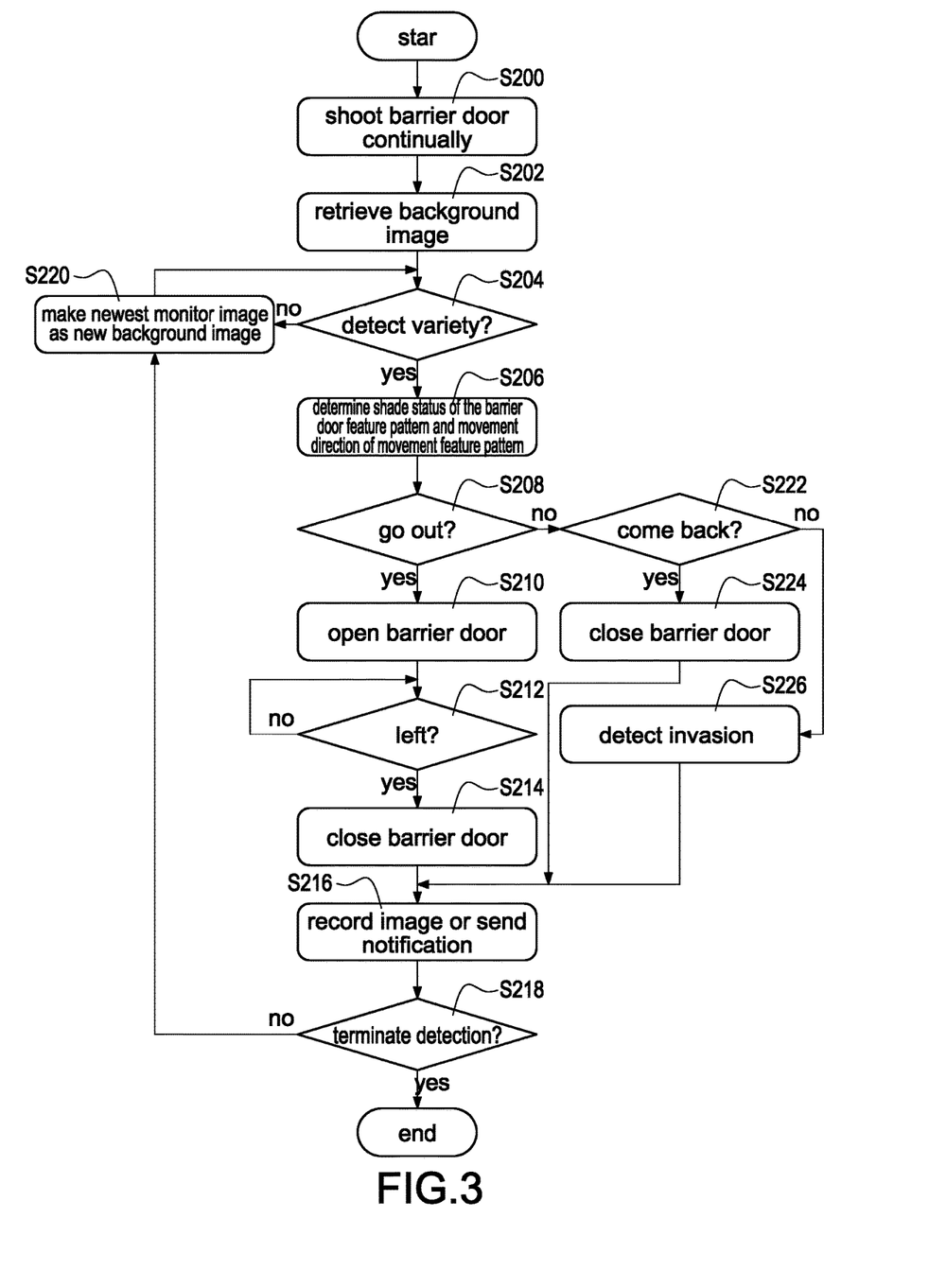
FIG. 3 is a flowchart of a method for controlling barrier door according to a second embodiment of the present disclosed example.

Please refer to FIG. 1 and FIG. 3 simultaneously; FIG. 3 is a flowchart of a method for controlling barrier door according to a second embodiment of the present disclosed example. The method for controlling barrier door of this embodiment comprises following steps.

Step S200: the controller 100 shoots the barrier door 20 continually via the monitoring camera 104 for generating the plurality of the monitor images.

Step S202: the controller 100 retrieves a pre-stored background image. Preferably, the background image is captured when the barrier door is closed.

Step S204: the controller 100 detects whether the monitoring environment occurs variety according to the background image. More specifically, the controller 100 calculates a difference value via comparing the background image with the newest shot monitor image, and compares the calculated difference value with a difference threshold pre-stored in the memory 108.

If the difference value is greater than the difference threshold, the controller 100 determines that the monitor scene has variety, and performs a step S206 for determining a reason of the monitor scene varying (such as human entering or the barrier door 20 being opened/closed. Otherwise, the controller 100 performs a step S220.

Step S206: the controller 100 determines the shade status of the barrier door feature pattern and the movement direction of the movement feature pattern continually according to the plurality of the monitor images. The mean of determining the shade status and the movement direction is same or similar to above-mentioned steps S12-S14, the relevant description is omitted for brevity.

Step S208: the controller 100 determines whether the current condition is consistent with the condition of going out according to the shade status of the barrier door feature pattern and the movement direction of the movement feature pattern. More specifically, the controller 100 determines whether the shade status of the barrier door feature pattern is consistent with the first default status (such as being completely shaded by the movable object), the movement direction of the movement feature pattern is consistent with the first default direction (such as approaching heading to the barrier door 20 inside out), and an open-close status of the barrier door 20 is closed (namely, the first default open-close status), and determines that the user wants to go out when above-mentioned conditions are consistent and performs a step S210. Otherwise, the controller 100 performs a step S222.

Step S210: the controller 100 controls the motor 1020 of the driving device 102 to operate heading to a first operation direction (such as the clockwise direction) for opening the barrier door 20.

Step S212: the controller 100 determines whether the shade status of the barrier door feature pattern and the movement direction of the movement feature pattern are consistent with a condition of leaving. More specifically, above-mentioned condition of leaving comprises a second default status, a default direction and a second default open-close status of the barrier door 20. The controller 100 determines whether the shade status of the barrier door feature pattern is consistent with the second default status (such as the barrier door feature pattern completely exposed), the movement direction of the movement feature pattern is consistent with the second default direction, and the open-close status of the barrier door 20 is open (namely, the second default open-close status), and determines that the user had left when above-mentioned conditions are consistent and performs a step S214. Otherwise, the controller 100 performs the step S212 for determining continually.

In another embodiment of the present disclosed example, the controller 100 determines that the user had left when determining that the shade status of the barrier door feature pattern is consistent with the second default status, the position of the movement feature pattern doesn't be detected and the open-close status of the barrier door 20 is open.

Step S214: the controller 100 controls the motor 1020 of the driving device 102 to operate heading to a second operation direction (such as the counterclockwise direction) which is opposite to the first direction for closing the barrier door 20.

Thus, the present disclosed example can automatically close the barrier door 20 when the user had left, so as to provide the better user experience.

Step S216: the controller 100 stores the monitor images which captured during the time of detecting the monitor scene varied (step S204, yes) to the time of completely closing the barrier door 20 (step S214) in the memory 108 permanently. Furthermore, the controller 100 can further send an open-close barrier door notification to the user electronic device 26 via the network device 106.

Step S218: the controller 100 determines whether terminating the detection (such as the user turning the function of automatically controlling barrier door off). If terminating the detection, the controller 100 terminates the method for controlling barrier door. Otherwise, the controller 100 performs a step S220.

If the controller 100 doesn't detect any variety in monitor scene in the step S204, or determines that the detection doesn't terminate in step S218, the controller 100 performs a step S220: the controller 100 making the newest compared monitor image as the new background image, and performing the step S204 again for continually detecting whether the monitor scene occurs any variety according to the new background image and the new shot monitor image.

If the controller 100 determines that the current condition is not consistent with condition of going out in the step S208, the controller 100 performs a step S222: the controller 100 determining whether the current condition is consistent with the condition of a default condition of coming back according to the shade status of the barrier door feature pattern and the movement direction of the movement feature pattern. More specifically, the condition of coming back comprises a third default status, a third default direction and a third default open-close status of the barrier door 20. The controller 100 determines whether the shade status of the barrier door feature pattern is consistent with the third default status (such as the barrier door feature pattern completely exposed), the movement direction of the movement feature pattern is consistent with the third default direction (such as heading to the barrier door 20 outside in), and the open-close status of the barrier door 20 is open (namely, the third default open-close status, such as the user manually opening the barrier door 20 when coming back), and determines that the user had come back when above-mentioned conditions are consistent and performs a step S224. Otherwise, the controller 100 performs the step S226.

Step S224: the controller 100 controls the motor 1020 of the driving device 102 to operate heading to the second operation direction for closing the barrier door 20 after the user had come back.

Thus, the present disclosed example can close the barrier door 20 automatically when the user comes back, so as to provide the better user experience.

If the controller 100 determines that the current condition is not consistent with the condition of coming back, the controller 100 performs a step S226: the controller 100 executing an invasion-detecting procedure. More specifically, during executing the invasion-detecting procedure, the controller 100 senses via the sensor 116 whether any human invades into the monitoring environment, or recognizes whether any human invades via recognizing the shot monitor images. When any human invades, the controller 100 stores the monitor images shot recently in memory 108 permanently, or sends an invasion notification message to the user electronic device 26 via the network device 106.

In another embodiment of the present disclosed example, the controller 100 can store the monitor images permanently and send the invasion notification message to the user electronic device 26 simultaneously.

Thus, the present disclosed example can effectively achieve the security monitor function.

Figure 4A:
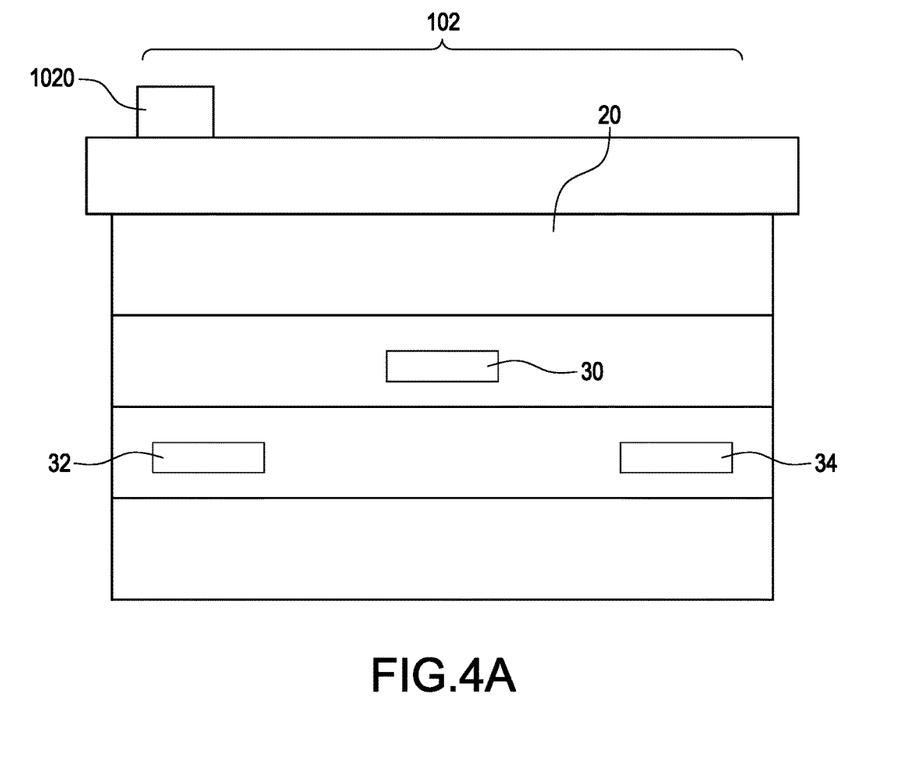
FIG. 4A is a first schematic view of controlling barrier door of the disclosed example.
Figure 4B:
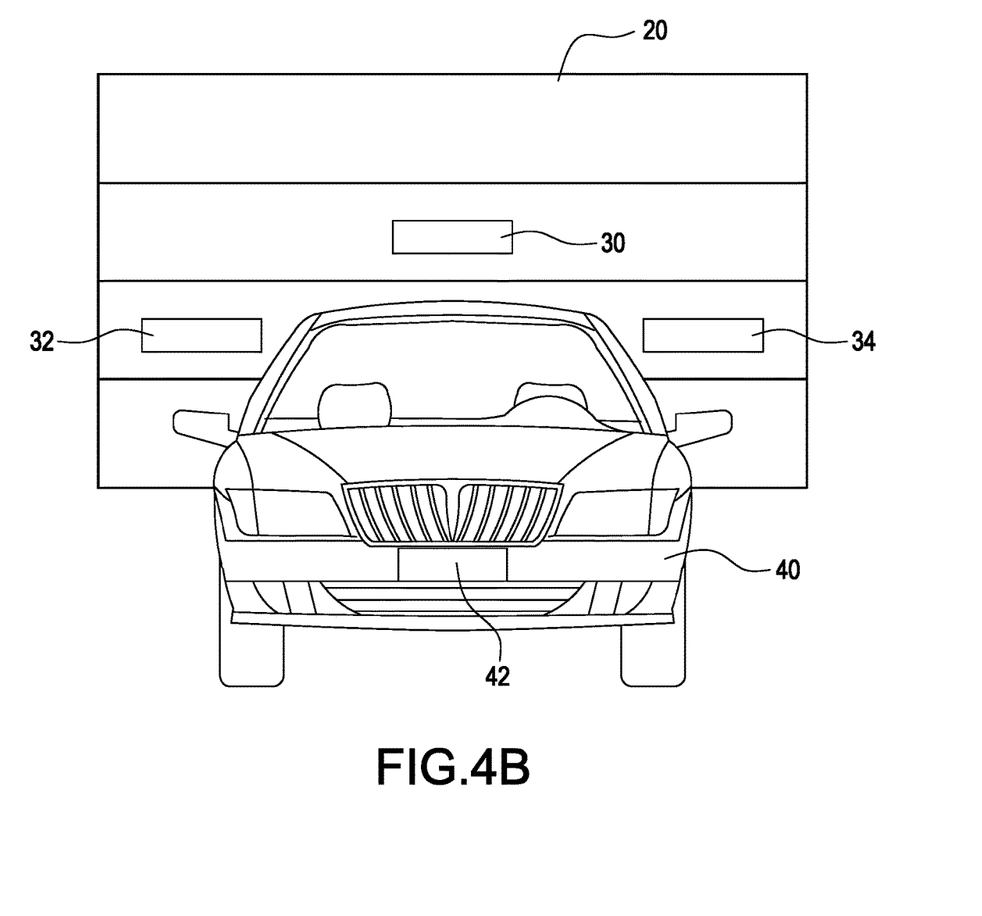
FIG. 4B is a second schematic view of controlling barrier door of the disclosed example.
Figure 4C:
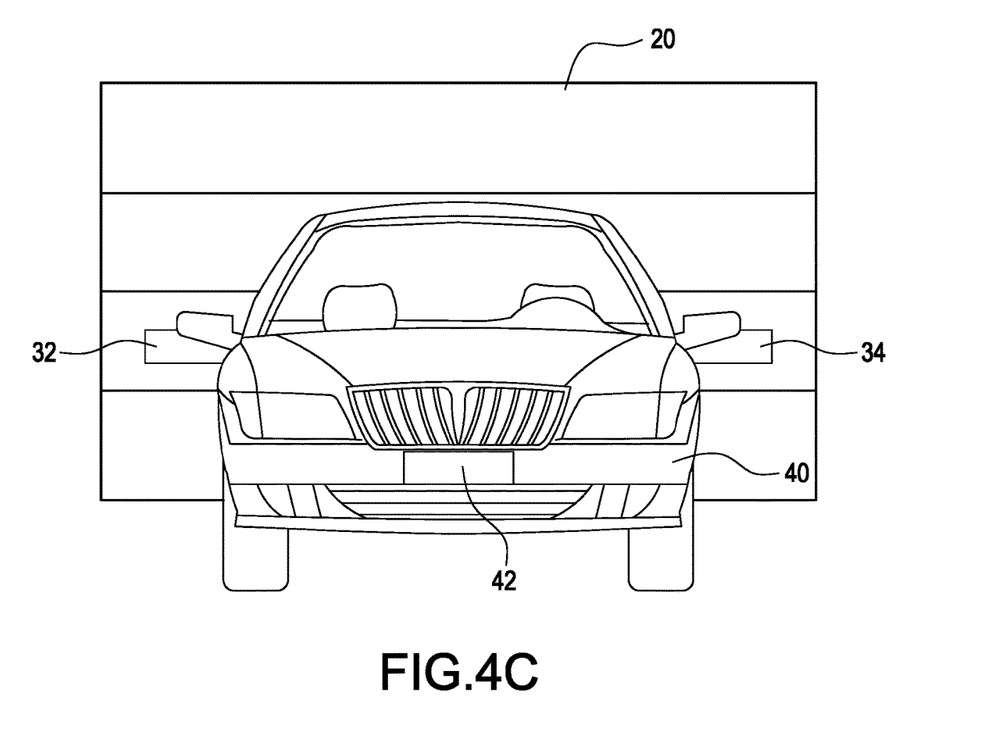
FIG. 4C is a third schematic view of controlling barrier door of the disclosed example.
Figure 4D:
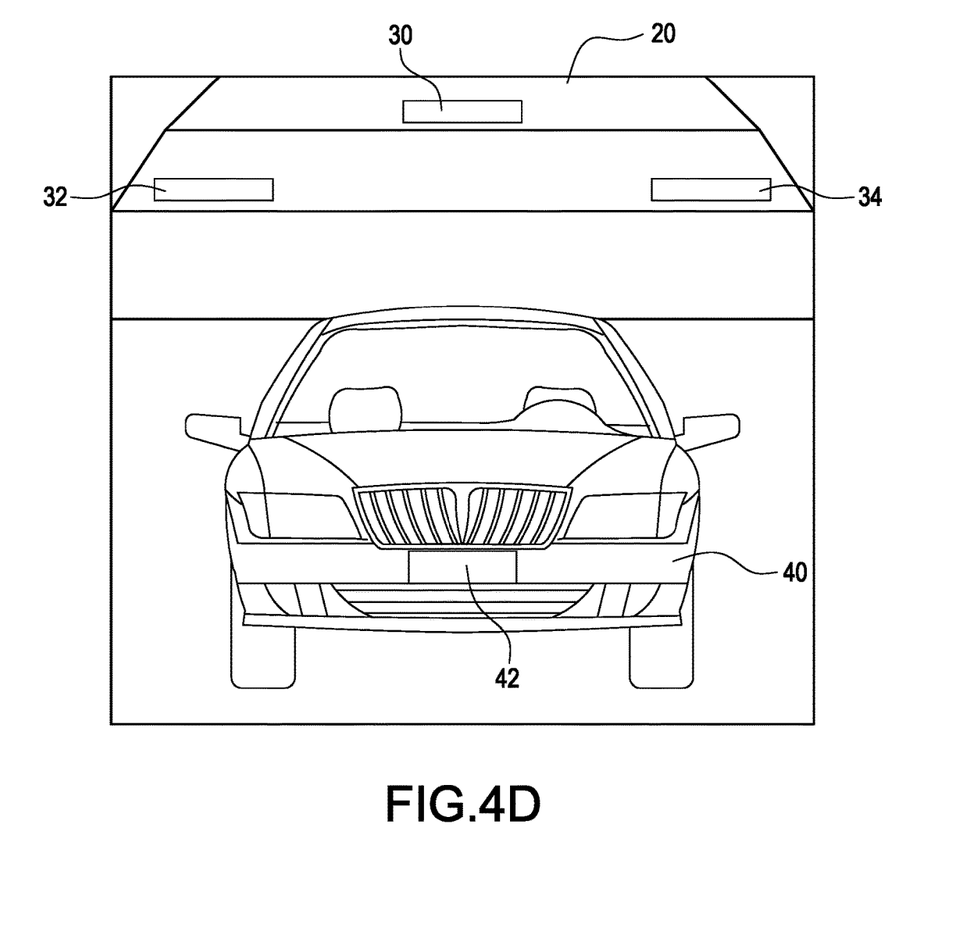
FIG. 4D is a fourth schematic view of controlling barrier door of the disclosed example.
Figure 4E:
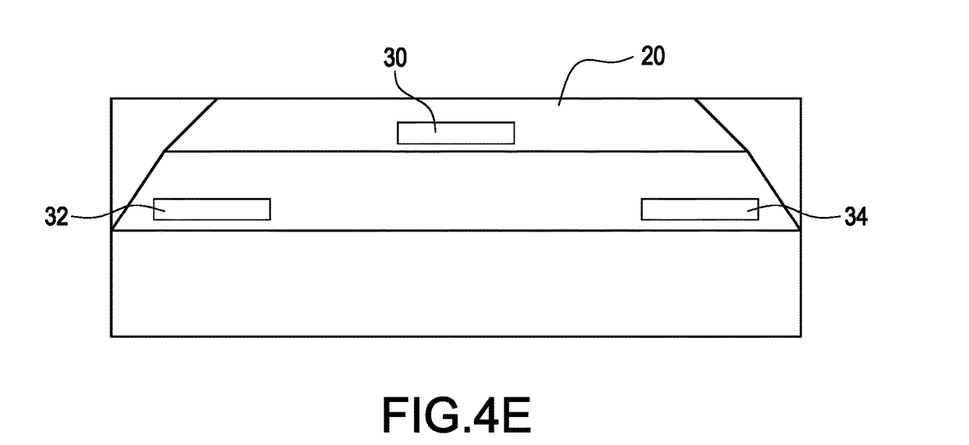
FIG. 4E is a fifth schematic view of controlling barrier door of the disclosed example.
Figure 4F:
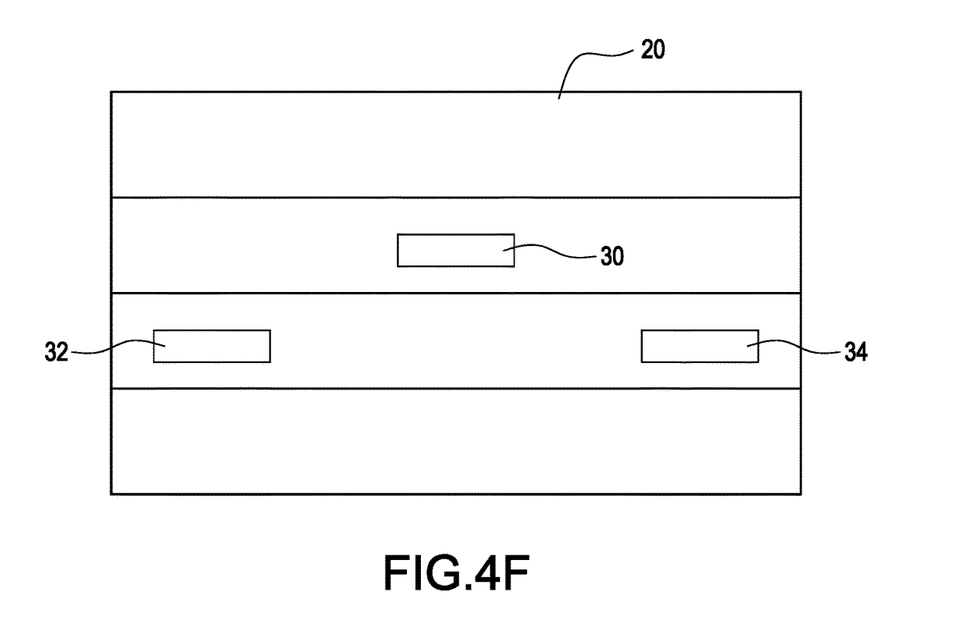
FIG. 4F is a sixth schematic view of controlling barrier door of the disclosed example.
Figure 4G:
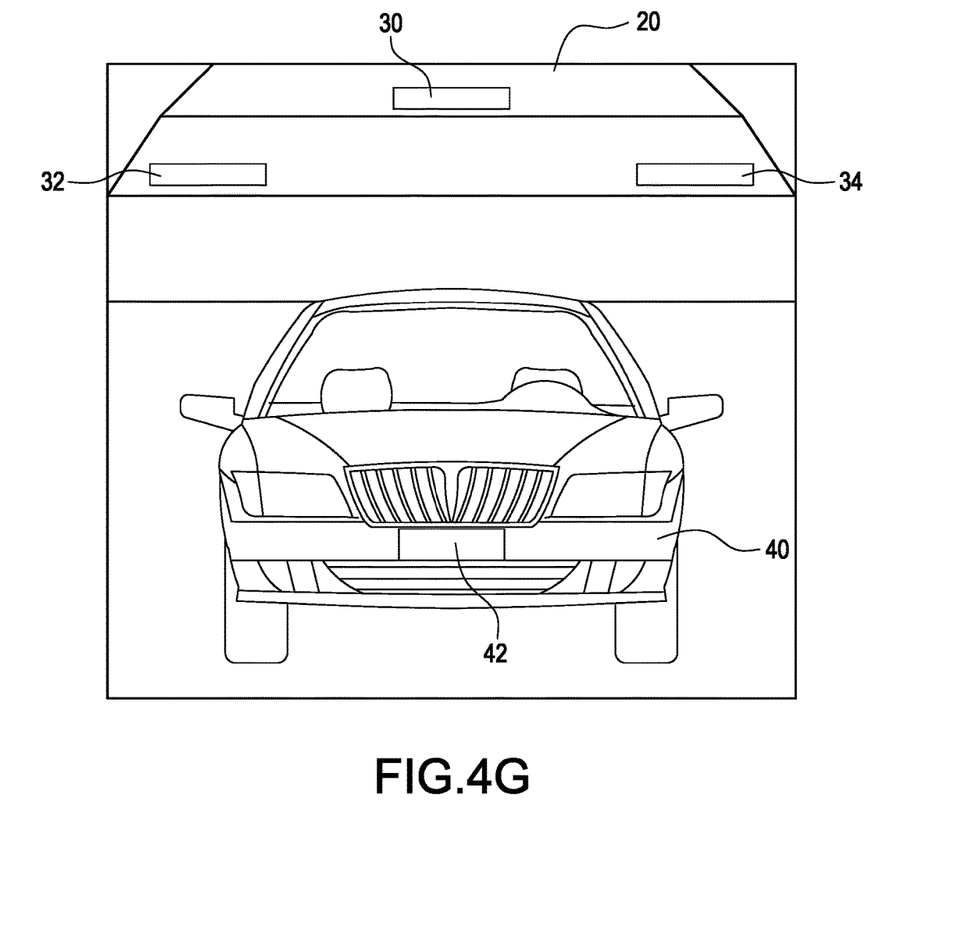
FIG. 4G is a seventh schematic view of controlling barrier door of the disclosed example.
Figure 4H:
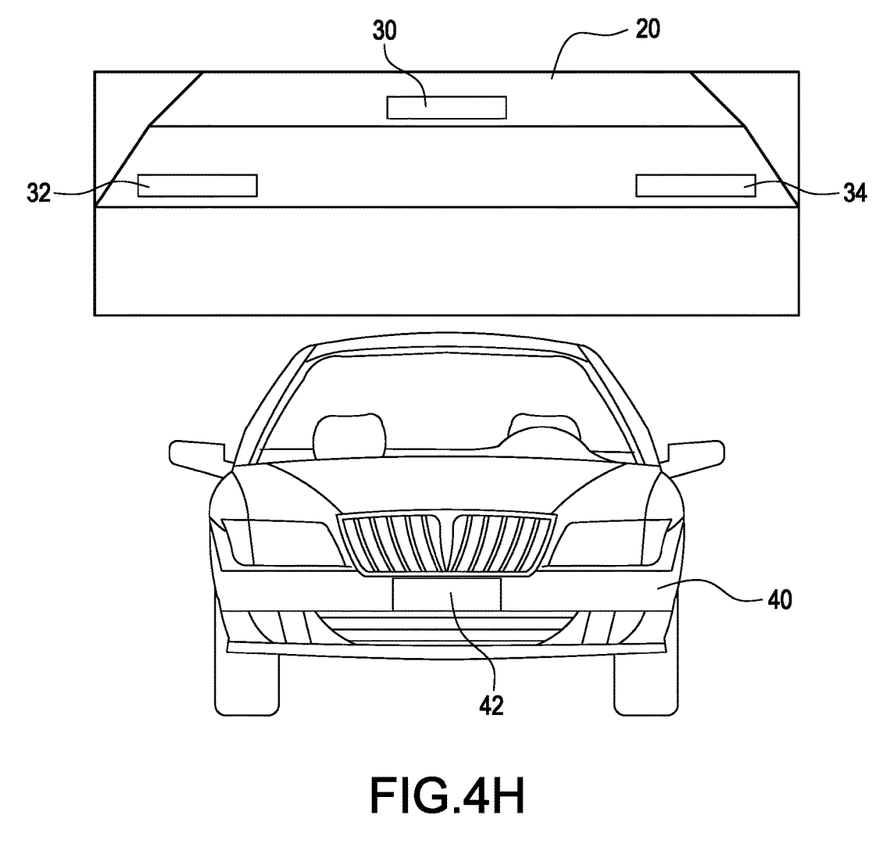
FIG. 4H is an eighth schematic view of controlling barrier door of the disclosed example.
Figure 4I:
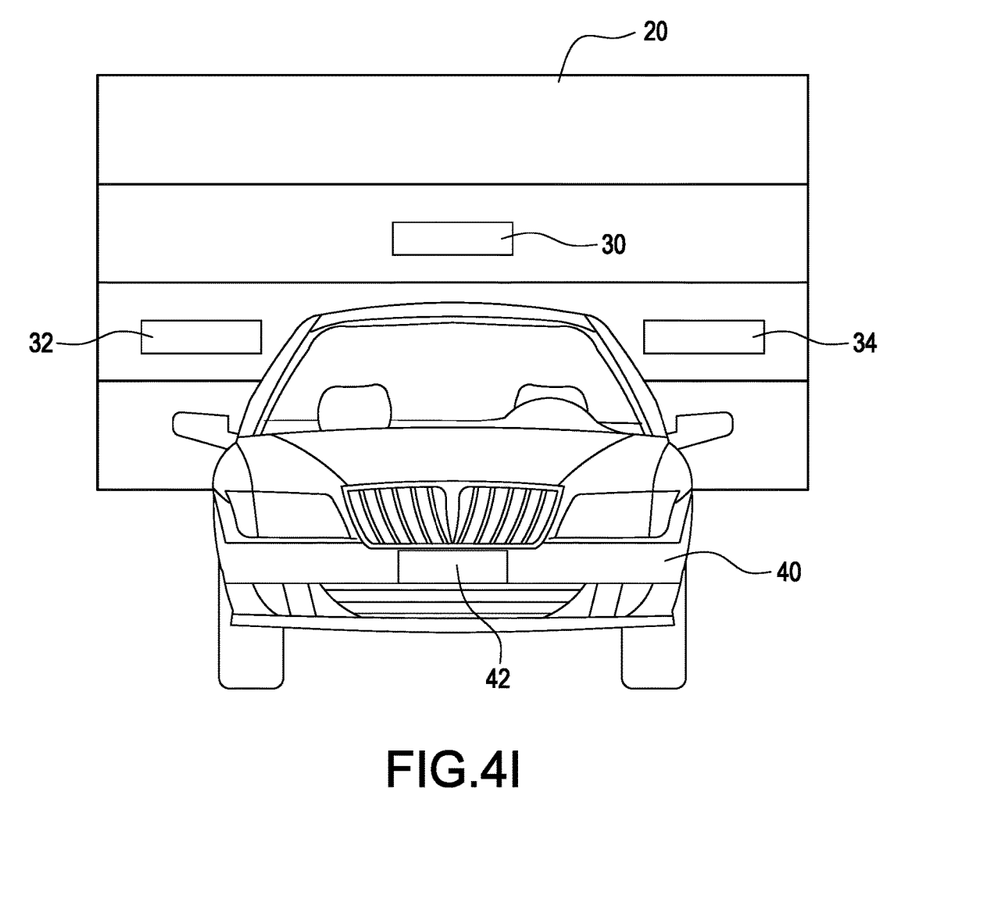
FIG. 4I is a ninth schematic view of controlling barrier door of the disclosed example.

Please refer to FIG. 4A to FIG. 4I, FIG. 4A is a first schematic view of controlling barrier door of the disclosed example, FIG. 4B is a second schematic view of controlling barrier door of the disclosed example, FIG. 4C is a third schematic view of controlling barrier door of the disclosed example, FIG. 4D is a fourth schematic view of controlling barrier door of the disclosed example, FIG. 4E is a fifth schematic view of controlling barrier door of the disclosed example, FIG. 4F is a sixth schematic view of controlling barrier door of the disclosed example, FIG. 4G is a seventh schematic view of controlling barrier door of the disclosed example, FIG. 4H is an eighth schematic view of controlling barrier door of the disclosed example, and FIG. 4I is a ninth schematic view of controlling barrier door of the disclosed example.

In this example, the barrier door 20 is a garage door, the movable object is a car 40, the monitoring environment is inside of a garage, and the movement feature pattern is a license plate 42.

As shown in FIG. 4A, the plurality of the barrier door feature patterns 30-34 is printed on the papers and the printed papers are pasted up on the barrier door 20 in triangular arrangement. The driving device 102 (comprising motor 1020) can control the barrier door 20 to open or close. The monitoring camera 104 shoots heading to the barrier door 20.

FIG. 4B is the monitor image shot when the car 40 is parked in the garage. As shown in figure, the plurality of the barrier door feature pattern 30-34 are completely exposed in this time, and the license plate 42 is located at a specific region of the image (the bottom of the image in this example).

Then, when the user wants to drive out and drives the car 40 in a direction close to the barrier door 20, the monitoring camera 104 will shoot the image as shown in FIG. 4. In this time, the plurality of the barrier door feature patterns 30-34 is shaded (in this example, the barrier door feature pattern 30 is completely shaded, the barrier door feature pattern 32-34 are partially shaded), the position of the license plate 42 is changed and moves heading to outside of the barrier door 20 (in this example, the license plate 42 moves heading to top of the monitor image), the controller 100 can determine that the user wants to go out and can control the driving device 102 to open the barrier door 20 (as shown in FIG. 4D).

Then, after the user had driven out, the monitoring camera 104 will shoot the image as shown in FIG. 4E. In this time, because the barrier door 20 had been opened, the plurality of the barrier door feature pattern 30-34 had been change their positions, areas and/or shapes in the monitor image. Besides, the controller 100 doesn't have ability of recognizing the license plate 42 in the monitor image, so that the controller 100 can determine that the user had left, and controls the driving device 102 to close the barrier door 20 (as shown in FIG. 4F).

Then, when the user comes back and opens the barrier door 20 manually, the monitor camera 104 will shoot the image as shown in FIG. 4G. In this time, because the barrier door 20 had been opened, the plurality of the barrier door feature pattern 30-34 had changed their positions, areas and/or shapes in the monitor image. Besides, the license plate 42 can be recognized and moved heading to a direction of inside of the barrier door 20 (namely, the bottom of the image), the controller 100 can determine that the user had come back via above-mentioned reorganization.

Finally, the controller 100 detects the position and the movement direction of the license plate 42 continually, determines that the user had parked the car 40 when the license plate 42 had moved to a specific position (such as the position of the license plate 42 as shown in FIG. 4H), and controls the driving device 102 to close the barrier door 20 (as shown in FIG. 4I).

Thus, the present disclosed example can use the computer vision technology to determine the user's purpose, and controls the barrier door 20 to open or close automatically according to the user's purpose.

Figure 5:
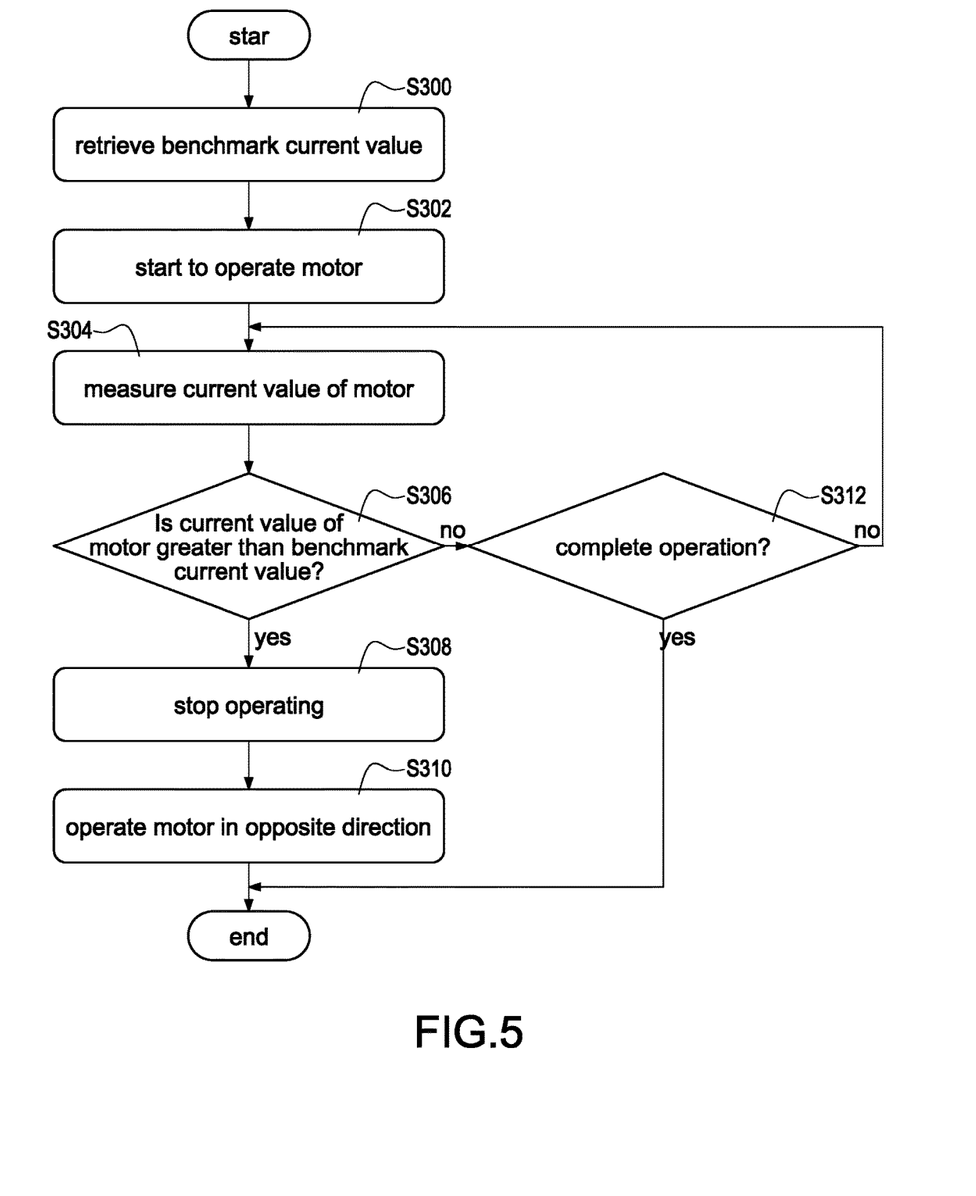
FIG. 5 is a flowchart of a barrier door operation of the present disclosed example.

Please refer to FIG. 1-3 and FIG. 5 simultaneously; FIG. 5 is a flowchart of a barrier door operation of the present disclosed example. the present disclosed example further provide a damage-preventing function which can make the system 1 for controlling barrier door executes a protection mechanism automatically to prevent the barrier door 20 and an obstacle from damage caused by extrusion when detecting that the motor 1020 operates abnormally. More specifically, the controller 100 can perform following steps simultaneously during controlling the barrier door 20 to open or close via the driving device 102 (such as the step S18 shown in FIG. 2 and the steps S210, S214 and S224 as shown in FIG. 3).

Step S300: the controller 100 loads a default benchmark current value from the memory 108.

Step S302: the controller 100 starts to control the motor 1020 to operate (such as rotating heading to a first operation direction for opening or closing the barrier door 20).

Step S304: the controller 100 measures a current value of the motor 1020 continually via the current measuring device 112.

Step S306: the controller 100 determines whether the current value of the motor 1020 is greater than a benchmark current value. If the current value of the motor 1020 is greater than a benchmark current value, the controller 100 performs a step S308. Otherwise, the controller 100 performs a step S312

Step S308: the controller 100 controls the motor 1020 to stop operating for making the barrier door 20 stop opening or closing.

More specifically, when the barrier door 20 collides with the obstacle during opening or closing, the motor 1020 will increase its rotation speed such that the current value of the motor 1020 will increase. The present disclosed example can effectively prevent the barrier door 20 and the obstacle from damage caused by extrusion via stopping operating the motor 1020 automatically when detecting that the current value of the motor 1020 is abnormally.

Step S310: after the motor 1020 stopped operating, the controller 100 can further control motor 1020 to reverse rotate (such as rotating heading to a second operation direction which is opposite to the first direction), so as to make the barrier door 20 move a specific distance in the opposite direction and provide the user a space of excluding the obstacle.

If the controller 100 determines that the current value of the motor 1020 is not greater than the benchmark current value in step S306, the controller 100 performs a step S312: the controller 100 determining whether the open/close operation of the barrier door 20 had completed (namely, whether the barrier door 20 had opened or closed completely). If the controller 100 determines that the open/close operation had completed, the controller 100 terminates the operation. Otherwise, the controller 100 performs the step S304 again.

Preferably, the controller 100 determines whether the open/close operation of the barrier door 20 had completed according to the position and shade status of the barrier door feature pattern in the monitor image (such as determining whether the position of the barrier door feature pattern is consistent with a default position).

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:
1. A method for controlling barrier door, comprising:
a) shooting a barrier door (20) continually via a monitoring camera (104) for generating a plurality of monitor images;

b) continually recognizing a barrier door feature pattern (30-34) arranged on the barrier door (20) from the monitor images and determining a shade status of the barrier door feature pattern (30-34);

c) continually recognizing a movement feature pattern arranged on a movable object from the monitor images and determining a movement direction of the movement feature pattern; and d) controlling the barrier door (20) to open when the shade status is consistent with a first default status, the movement direction is consistent with a first default direction, and an open-close status of the barrier door (20) is closed.

2. The method for controlling barrier door according to claim 1, wherein the method for controlling barrier door further comprises following steps before the step d):

e1) calculating a difference value between a background image and the monitor image latest generated;

e2) determining whether the shade status is consistent with the first default status, the movement direction is consistent with the first default direction, and the open-close status of the barrier door (20) is closed when the difference value is greater than a difference threshold; and e3) setting the monitor image latest generated as the new background image.

3. The method for controlling barrier door according to claim 2, wherein the method for controlling barrier door further comprises:

f1) executing an invasion-detecting procedure when the difference value is greater than the difference threshold; and f2) storing the monitor images or send an invasion notification message to a user electronic device (26) via a network (24) when detecting that any human invades.

4. The method for controlling barrier door according to claim 1, wherein the method for controlling barrier door further comprises a step g) controlling a driving device (102) to close the barrier door (20) when the shade status is consistent with a second default status, the movement direction is consistent with a second default direction, and the open-close status of the barrier door (20) is open, wherein the first default status is that the barrier door feature pattern (30-34) is completely shaded, the second default status is that the barrier door feature pattern (30-34) is completely exposed, the first default direction and the second default direction are directions heading toward outside of the barrier door (20).

5. The method for controlling barrier door according to claim 4, wherein the method for controlling barrier door further comprises a step h) controlling the driving device (102) to close the barrier door (20) when the shade status is consistent with a third default status, the movement direction is consistent with a third default direction, and the open-close status of the barrier door (20) is open, wherein the third default status is that the barrier door feature pattern (30-34) is completely exposed, the third default direction is a direction heading toward inside of the barrier door (20).

6. The method for controlling barrier door according to claim 1, wherein the step d) comprises:

d1) controlling a motor (1020) to operate in a first operation direction for opening the barrier door (20) when the shade status is consistent with the first default status, the movement direction is consistent with the first default direction, and the open-close status of the barrier door (20) is closed;

d2) measuring a current value of the motor (1020) continually during opening the barrier door (20); and d3) controlling the motor (1020) to stop operating when the current value of the motor (1020) is greater than a benchmark current value, and controlling the motor (1020) to operate in a second operation direction which is opposite to the first operation direction.

7. The method for controlling barrier door according to claim 1, wherein the barrier door feature patterns (30-34) are arranged on the barrier door (20), the step b) is to detect a plurality of positions of the barrier door feature patterns (30-34) arranged on the barrier door (20) in the monitor images using the Scale-Invariant Feature Transform algorithm, and determining the shade status according to a result of detecting the positions.

8. The method for controlling barrier door according to claim 1, wherein the movement feature pattern is a license plate (42), the step c) is to determine the movement direction via detecting a position variety of the movement feature pattern in the monitor images sequentially generated.

9. The method for controlling barrier door according to claim 1, wherein the step d) is to calculate a movement vector of the barrier door feature patterns according to a position variety of the barrier door feature patterns arranged on the barrier door (20) in the monitor images sequentially generated, determining a displacement variety of the barrier door (20) according to the movement vector, and determining the open-close status of the barrier door (20) according to the displacement variety.

\* \* \* \* \*